United States Patent
Noronha et al.

(10) Patent No.: US 10,131,271 B2
(45) Date of Patent: Nov. 20, 2018

(54) CUT-OFF MECHANISM FOR MOTOR VEHICLE HEADLIGHT, ACTUATED BY AN ELECTROMAGNET WITH TWO AIR GAPS

(71) Applicant: AML SYSTEMS, Paris (FR)

(72) Inventors: Anderson Noronha, Fontenay Sous Bois (FR); Claudio Chiattelli, Le Blanc-Mesnil (FR); Hassan Koulouh, Le Pre Saint Gervais (FR)

(73) Assignee: AML SYSTEMS, Paris (FR)

( * ) Notice: Subject to any disclaimer, the term of this patent is extended or adjusted under 35 U.S.C. 154(b) by 1 day.

(21) Appl. No.: 15/410,026

(22) Filed: Jan. 19, 2017

(65) Prior Publication Data

US 2017/0203683 A1    Jul. 20, 2017

(30) Foreign Application Priority Data

Jan. 20, 2016   (FR) ...................... 16 50441

(51) Int. Cl.
  *B60Q 1/14*    (2006.01)
  *H02K 33/02*   (2006.01)
  *F21S 41/686*  (2018.01)

(52) U.S. Cl.
  CPC .......... *B60Q 1/1438* (2013.01); *F21S 41/686* (2018.01); *H02K 33/02* (2013.01)

(58) Field of Classification Search
  CPC .... B60Q 1/1438; F21S 48/1773; H02K 33/02
  See application file for complete search history.

(56) References Cited

U.S. PATENT DOCUMENTS

2007/0040811 A1   2/2007  Yang et al.
2010/0103690 A1*  4/2010  Keilig ............... F21S 48/1773
                                                    362/513
2012/0254197 A1  10/2012  Kuzmin

FOREIGN PATENT DOCUMENTS

EP   2180245 A1   4/2010
EP   2461093 A2   6/2012
FR   3030686 A1   6/2016

OTHER PUBLICATIONS

French Patent Office Search report dated Sep. 23, 2016 re French Application No. FR 1650441 of AML Systems.

* cited by examiner

*Primary Examiner* — Thomas M Sember
(74) *Attorney, Agent, or Firm* — Patrick J. Daugherty; Driggs, Hogg, Daugherty & Del Zoppo Co., LPA

(57) ABSTRACT

Cut-off mechanisms for a motor vehicle headlight activated by an electromagnet with two gaps comprise a movable assembly that comprises a cut-off bar and a movable element, as well as an actuator motor comprising an electromagnet, the movable element being movable under the action of the electromagnet, against a return spring, between a near activation position and a remote rest position relative to a ferromagnetic core of the electromagnet, the movable element being configured to create an interruption in the continuity of a magnetic circuit formed by the ferromagnetic core, a metallic casing and the movable element, when said element comes near to the ferromagnetic core in the activation position.

13 Claims, 5 Drawing Sheets

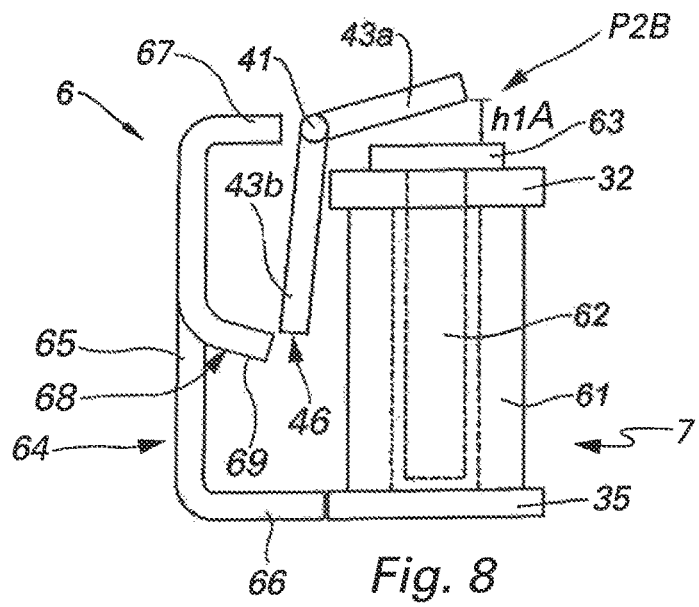
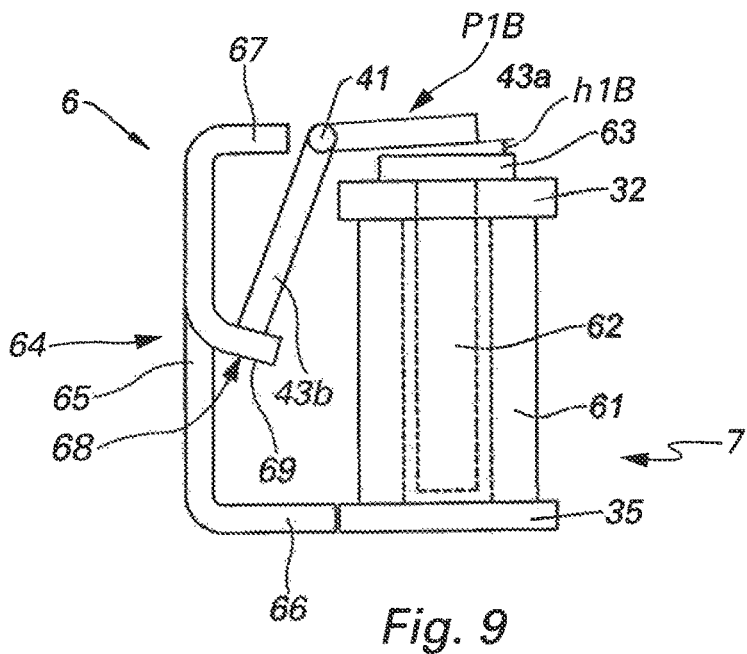
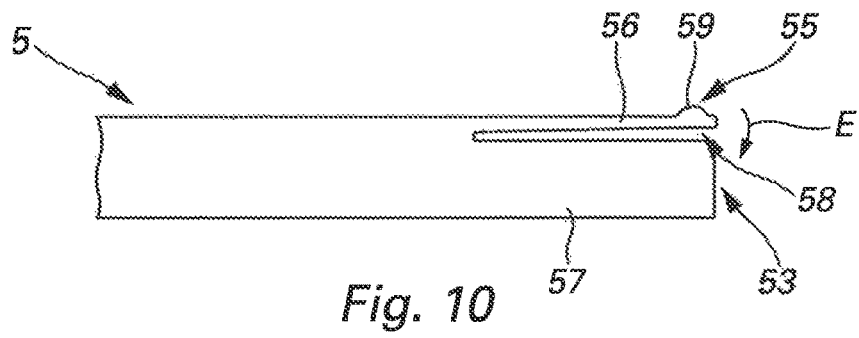

CUT-OFF MECHANISM FOR MOTOR VEHICLE HEADLIGHT, ACTUATED BY AN ELECTROMAGNET WITH TWO AIR GAPS

BACKGROUND

The field of the present invention is that of headlights and, more specifically, that of motor vehicle headlights.

Motor vehicle headlights generally comprise a reflector, in which a light source and means for controlling the shape of the beam to adapt the beam to the driving conditions are disposed.

It is known for a cut-off bar (or blade) to be used that allows various occultation phases of the light beam to be provided. The cut-off bar is actuated electrically in order to move, on command, between at least two angular positions, in which it more or less occults the light beam. This allows the range of the headlight to be limited, for example to that of the dipped beam, called code position, so as not to dazzle oncoming drivers, or also to that of the main beam, called road position, in which there is no occultation.

The devices of the prior art that control the position of the cut-off bar are generally made up of an actuator motor associated with a sensor of the position of the cut-off bar or a stop that defines the rest position of the cut-off bar. For safety reasons, this rest position is associated with the code position in order to prevent oncoming drivers from being dazzled in the event of a failure of the device for actuating the bar. The return to the stop position or to the extreme position is generally provided by a spring.

In order to produce the actuator motors, the use of an electromagnet is known that exerts, against a return spring, an attraction force on a movable element connected to the cut-off bar. It further comprises a metallic casing that forms a cradle for the electromagnet and that provides its magnetic loop. The electromagnet comprises an induction coil formed by turns, which are supplied with electric current in order to actuate the motor, and a ferromagnetic core that is placed at the centre of the coil. This core is longitudinally fixed in the coil and is used to act as a point of attraction for the movable element when the coil is powered.

SUMMARY

Cut-off mechanisms for a motor vehicle headlight, include mechanisms (3) comprising a movable assembly (8) that comprises a cut-off bar (5) and a movable element (40) supporting the cut-off bar (5), the cut-off bar (5) being configured to enable a light beam to be more or less obstructed in order to change the optical operating mode of said headlight (10), said mechanism (3) further comprising a motor (6) for actuating said movable element (40), the actuator motor (6) comprising an electromagnet (7) that comprises an induction coil (61) associated with a fixed ferromagnetic core (62) positioned at its centre and a metallic casing (64) surrounding said induction coil (61), said movable element (40) being movable under the action of said electromagnet (7), against at least one return spring (45), between a first, near position and a second, remote position relative to said ferromagnetic core (62) via a first gap (h1A), wherein said movable element (40) is configured to create an interruption in the continuity of a magnetic circuit formed by said ferromagnetic core (62), said metallic casing (64) and said movable element (40), when it comes near to said ferromagnetic core (62) in said first position.

In some of said mechanisms as described above said interruption in continuity forms a second gap (h2) in said magnetic circuit; and/or said magnetic circuit generates, in said second gap (h2), an attraction force on the movable element (40) that tends to maintain it in said first position relative to the ferromagnetic core (62); and/or said movable element (40) comprises a ferromagnetic plate (43) formed by an upper plate (43a) and a lower plate (43b) extending on both sides of a rotational shaft (41), and said lower plate (43b) approaches a branch (65) of the metallic casing (64), until said second gap (h2) is created, during a rotation that brings the upper plate (43a) near to the ferromagnetic core (62) in the first position of the movable element (40).

In some of said mechanisms as described above the metallic casing (64) comprises at least one attraction element (68) configured to facilitate the attraction of the movable element (40), so as to attract it and maintain it in said first position.

In some of said mechanisms as described above at least one attraction element (68) is arranged on one side (64A) of a central branch (65) of the metallic casing (64) at the lower end of a lower plate (43b) of a ferromagnetic plate (43), by being curved towards said lower plate (43b) and by being arranged laterally so as not to come into contact with the lower plate (43b) during the rotation of the movable element (40).

In some of said mechanisms as described above said attraction element (68) embodies a segment (69) that is partially cut out of the central branch (65) of the metallic casing (64) and is curved towards said lower plate (43b) in the second position of the movable element (40).

In some of said mechanisms as described above said metallic casing (64) comprises at least one attraction element (68) on each of the sides of the central branch (65).

In some of said mechanisms as described above said movable assembly (8) is configured to have a load distribution that allows a balanced position to be obtained relative to a rotational shaft (41) of said movable element (40) that is rotationally movable.

In some of said mechanisms as described above said load distribution is generated by adding or removing material to/from at least one of said upper (43a) and lower (43b) plates of the ferromagnetic plate (43).

In some of said mechanisms as described above said cut-off bar (5) is connected by a first longitudinal end (52) to the movable element (40) and it is provided, towards a second longitudinal end (53) opposite the first longitudinal end (52), with a flexible stop (55).

In some of said mechanisms as described above said stop (55) comprises a segment (56) formed longitudinally in the body (57) of the cut-off bar (5).

Aspects include a motor vehicle headlight comprising at least one cut-off mechanism as described above.

BRIEF DESCRIPTION OF THE DRAWINGS

The invention will be better understood, and further objects, details, features and advantages thereof will become more clearly apparent, throughout the following detailed description of embodiments of the invention, which are provided purely by way of an illustrative and non-limiting example, with reference to the accompanying schematic drawings, in which:

FIGS. 8 and 9 show schematic views of the motor for actuating the cut-off mechanism, respectively in a rest position and in an activation position, according to a second embodiment; and FIG. 10 shows a front view of one end of a cut-off bar.

DETAILED DESCRIPTION

Figure 1:
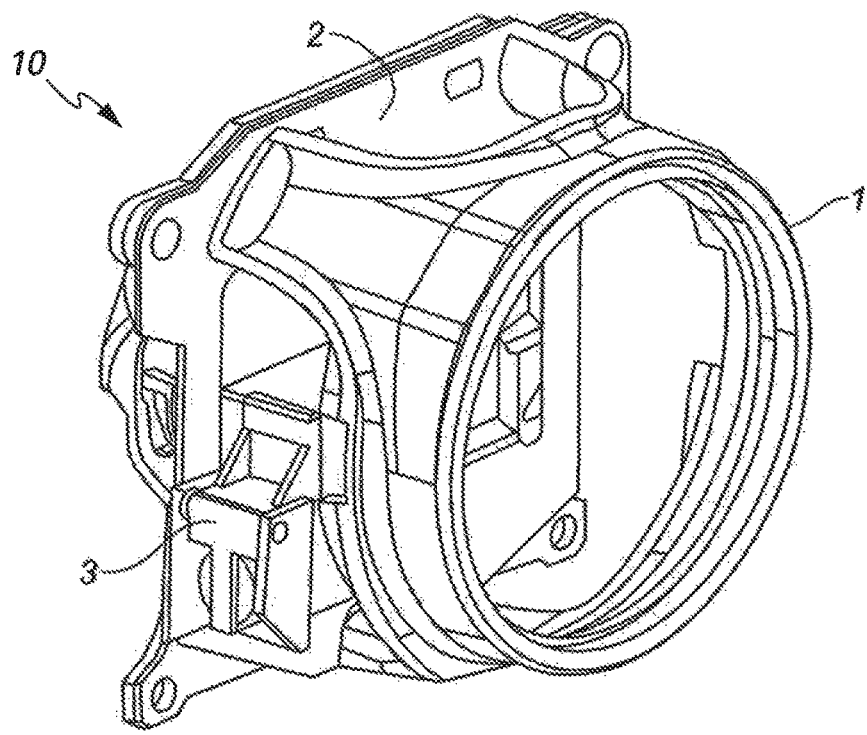
FIG. 1 shows a perspective view of an element of a vehicle headlight comprising a cut-off mechanism.

One of the problems that is encountered with electromagnets as described above is that the ferromagnetic core, even if it is made of iron or mild steel, magnetises slightly during the passage of the current and it retains a residual magnetisation after the current is cut off. An adhesion phenomenon then occurs on the movable element over a period of time, which, even if it is very short, is still incompatible with the reaction times that are required for the rotation of a cut-off bar of a cut-off mechanism.

Solutions have been proposed, such as the introduction of a non-ferromagnetic material, such as, for example, copper, between the electromagnetic core and the movable element, or also an arrangement that tends to increase the return torque on this movable element. To this end, this can involve an increase in the return force of the spring or an increase in the size of the lever arm through which this spring acts. The disadvantage of these situations is that they are either relatively expensive (for copper) or require a larger electromagnet, which is not desirable both in terms of price and of spatial requirement.

Therefore, the object of the present invention is to propose a mechanism for controlling a cut-off bar that does not have the disadvantages of the prior art and which particularly, whilst remaining low cost, is not sensitive to the phenomenon of residual magnetisation and, consequently, does not exhibit any adhesion of the movable element upon cut-off of the current.

To this end, the object of the invention is a cut-off element for a motor vehicle headlight, said mechanism comprising a movable assembly that comprises a cut-off bar and a movable element supporting the cut-off bar, the cut-off bar being configured to enable a light beam to be more or less obstructed in order to change the optical operating mode of said headlight, said mechanism further comprising a motor for actuating said movable element, the actuator motor comprising an electromagnet that comprises an induction coil associated with a fixed ferromagnetic core positioned at its centre and a metallic casing surrounding said induction coil, said movable element being movable under the action of said electromagnet, against at least one return spring, between a first, near position and a second, remote position relative to said ferromagnetic core via a first gap.

According to the invention, said movable element is configured to create an interruption in the continuity of a magnetic circuit formed by said ferromagnetic core, said metallic casing and said movable element, when it comes near to said ferromagnetic core (without contact with said ferromagnetic core) in said first position.

This interruption prevents the ferromagnetic parts that form the control motor from magnetising during the activation of the actuator motor and from remaining adhered together, even temporarily, when this activation is stopped.

Preferably, said interruption in continuity forms a second gap in said magnetic circuit. More preferably, said magnetic circuit generates in said second gap an attraction force on the movable element that tends to keep it near to the ferromagnetic core (in said first position). This additional force allows the main attraction force to be designed with a lower value.

Advantageously, the movable element comprises a ferromagnetic plate formed by an upper plate and a lower plate extending on both sides of a rotational shaft, and said lower plate approaches a branch of the metallic casing, until said second gap is created, during a rotation that brings the upper plate near to the electromagnetic core in the first position of the movable element.

In one particular embodiment, said metallic casing comprises at least one attraction element configured to facilitate the attraction of the movable element so as to attract it into said first position.

Advantageously, the attraction element is arranged on one side of a central branch of the metallic casing at the lower end of the lower plate of the ferromagnetic plate, by being curved towards said lower plate and by being arranged laterally so as not to come into contact with the lower plate during the rotation of the movable element. Preferably, the attraction element has a segment that is partially cut out of the central branch of the metallic casing and is curved towards said lower plate in the second position of the movable element.

In one particular embodiment, the metallic casing comprises at least one attraction element on each of the sides of the central branch.

Furthermore, in one preferred embodiment, the movable assembly is configured to have a load distribution that allows a balanced position to be obtained relative to an axis of rotation of said movable element that is rotationally movable.

Preferably, the load distribution is generated by adding or removing material to/from at least one of said upper and lower plates of the ferromagnetic plate.

By thus balancing the masses (or loads) of the movable element and the cut-off bar about the axis of rotation, the attraction force needed to rotate the movable assembly can be relatively low and can be generated using a small electromagnet.

Furthermore, in one preferred embodiment, the cut-off bar is connected via a first longitudinal end to the movable element and it is provided, towards a second longitudinal end opposite this first longitudinal end, with a flexible stop.

Preferably, said flexible stop comprises a segment formed longitudinally in the body of the cut-off bar.

The invention further relates to a motor vehicle headlight comprising at least one cut-off mechanism as described.

Throughout the following description, the longitudinal or lateral references are to be understood with reference to the optical axis of the reflector and the terms front or rear relate to the direction in which the light beam propagates.

FIG. 1 shows the front part of a motor vehicle headlight 10 comprising a lens holder 1 of cylindrical shape that extends forwards from an armature 2 of rectangular shape. This armature extends in a plane perpendicular to the optical axis of the beam and its centre is cut out to let said beam through. The cut-off mechanism is fixed to this armature; the purpose of the cut-off mechanism is to more or less obstruct the beam according to the driving conditions of the vehicle.

In an obscured manner, a light source for generating the beam and a reflector that orients this beam forwards and towards the lens (not shown) installed at the front end of the lens holder 1 are disposed behind this armature.

Figure 2:
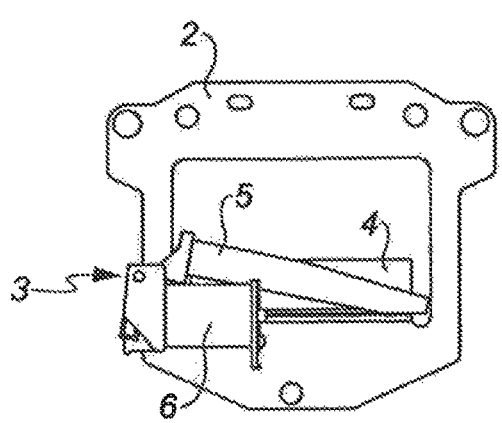
FIGS. 2 and 3 show front views of the cut-off mechanism of FIG. 1 positioned on an armature, respectively in the road and code positions.
Figure 3:
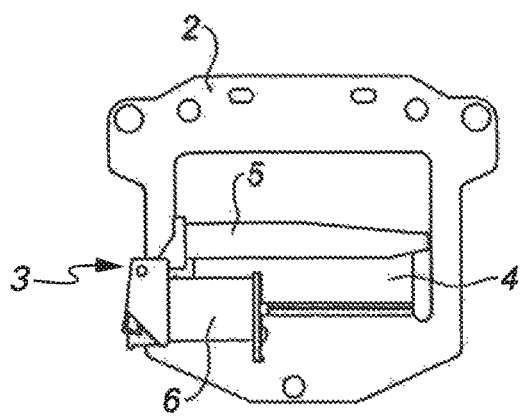

FIGS. 2 and 3 show, a front view, respectively in the road position and in the code position, of the cut-off mechanism 3, which is mounted in the lower position on the armature 2. This armature 2 comprises, in the lower part of its central cut-out, a fixed cover 4, which partly obstructs this cut-out and in front of which a cut-off bar (or blade) 5 can move in order to modulate the shape of the beam output from the headlight 10. This cut-off bar 5 is rotationally movable in a plane perpendicular to the light beam and is driven by an actuator motor 6.

In FIG. 2, which corresponds to the road position, the cut-off bar 5 is retracted, i.e. it is inclined downwards and exposes the fixed cover 4, which lets practically all of the light beam through. In FIG. 3, which corresponds to the code position, the bar is lifted and it cuts the beam over a greater height than is possible with the fixed cover 4 alone. After it is reversed by the lens, the beam is then oriented downwards, which prevents dazzling drivers of oncoming vehicles.

Figure 4:
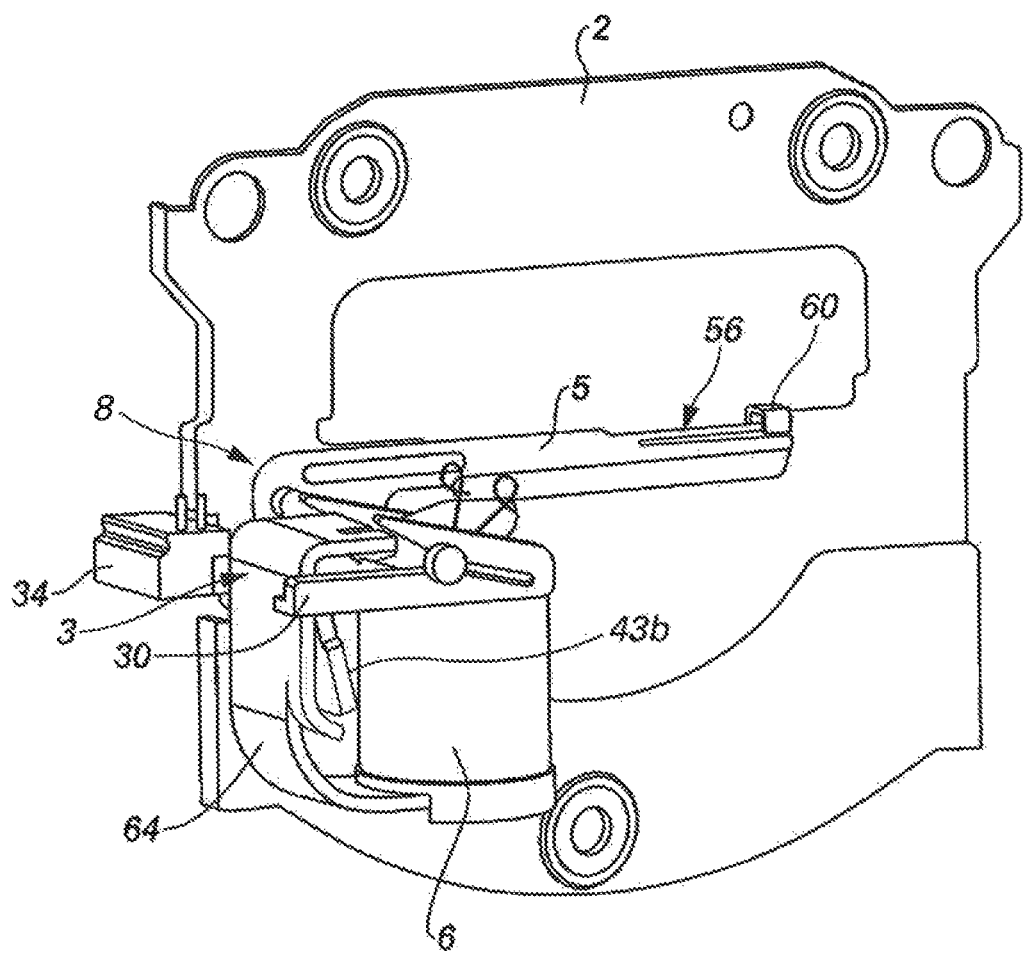
FIG. 4 shows a perspective view of a cut-off mechanism according to one embodiment of the invention in an assembled version.
Figure 5:
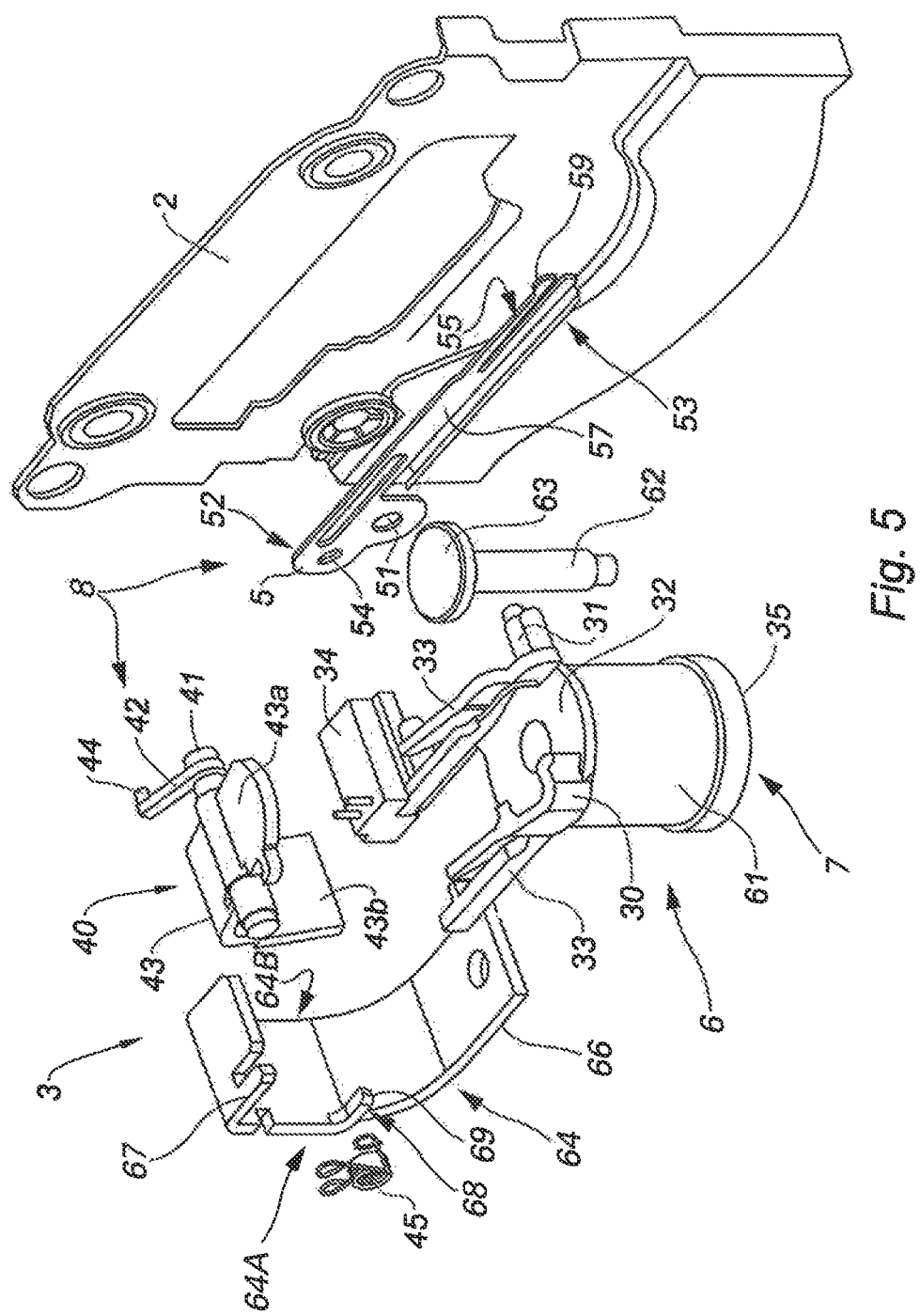
FIG. 5 shows an exploded view showing a perspective view of the various constituent elements of the cut-off mechanism of FIG. 4.

FIGS. 4 and 5 show the cut-off mechanism 3 according to one embodiment, in an assembled view and in an exploded view, respectively.

This cut-off mechanism 3 comprises the cut-off bar (or blade) 5 that is rotationally movable about a first pin 31 attached to a fixed structure 30 connected to the armature 2. It pivots about the first pin 31, in response to a command from the actuator motor, under the action of a lever arm 42 of a movable element 40, as specified hereafter. This movable element 40 forms, with the cut-off bar 5 and the means for connecting them together, a movable assembly 8 that is rotationally movable.

This fixed structure 30 comprises a platform 32, to which an electromagnet coil 61 is attached, which coil is powered, as necessary, with electric current in order to rotate or release the movable assembly 8 that comprises the movable element 40 and the cut-off bar 5. It further comprises two supports 33 that are connected to the platform 32 and that are designed to receive a rotational shaft 41 connected to the movable element 40 that drives the cut-off bar 5. It further comprises an electrical connector 34, through which the control current of the electromagnet passes.

In the particular embodiment that is shown, the two supports 33 are each in the shape of a V-shaped part with two uprights that progressively separate from each other in order to form a guide when introducing the rotational shaft 41 of the movable element. The base of the V-shape comprises a cylindrical cut-out acting as a receptacle for this rotational shaft 41 once it is placed on the fixed structure 30. The diameter of this cylindrical cut-out is slightly greater than the spacing of the two branches at the base of the V-shape, so as to form a retention clip for this rotational shaft after it is introduced.

The actuator motor 6 for actuating the cut-off bar 5 comprises an electromagnet 7. This electromagnet 7 conventionally comprises a coil (or induction coil) 61, which is attached to the platform 32 at its upper part and to a second platform 35 at its lower part, and a fixed, substantially cylindrical ferromagnetic core 62 that is placed at the centre of this coil, along its axis of symmetry. This ferromagnetic core 62 supports, at its upper end, a circular plate 63, the diameter of which is greater than that of the core 62, which extends from the platform 32 and acts as an attraction pole for the movable element 40. This ferromagnetic core 62 is fixedly positioned inside the coil 61 and acts as a guide, inside the coil, for the electromagnetic lines of force that are generated by the passage of a current in the electromagnet of the motor 6. These lines of force are used to generate an attraction on the movable element 40 by the circular plate 63.

The actuator motor 6 further comprises a U-shaped metallic casing 63 that surrounds the coil 61 and is conventionally designed to act as a guide for the electromagnetic lines of force outside of the coil 61. Whereas the central branch 65 of the metallic casing 64, formed by the base of the U-shape, extends parallel to the axis of the coil 61, its lower branch 66 comes into contact with the second platform 35, at the base of the ferromagnetic core 62, and its upper branch 67 returns towards the axis of the coil 61, in its upper part, whilst nevertheless remaining spaced apart from the circular plate 63 of the core 62.

The movable element 40 (FIGS. 6 and 7), the features of which are described hereafter, is positioned between the terminal (free) end 67a of the upper branch 67 of the metallic casing 64 and the circular plate 63.

The movable element 40 mainly comprises an L-shaped movable ferromagnetic plate 43, which is designed, on the one hand, to provide continuity in the guidance of the electromagnetic lines of force, in the extension of the metallic casing 64 and particularly towards the axis of the coil 61 and, on the other hand, to keep a gap open in this circuit, whether or not this movable ferromagnetic plate 43 is spaced apart from the fixed circular plate 63 of the ferromagnetic core of the induction coil 61. To this end, one of the branches of the ferromagnetic plate 43, called upper plate 43a, is substantially aligned with the upper branch 67 of the metallic casing 64, between the terminal end 67a of this upper branch 67 and the ferromagnetic core 62, whereas its other branch, called lower plate 43b, is substantially parallel to the central branch 65 of this metallic casing 64. This quasi-parallelism of the two parts of the movable ferromagnetic plate 43 with the central and upper branches of the metallic casing 64 allows the magnetic circuit about the coil 61 of the electromagnet to be provided with a certain amount of continuity.

The ferromagnetic plate 43 is rotationally movable and to this end has, on its upper plate 43a, a rotational shaft 41, about which the entire movable element 40 rotates. This rotational shaft 41 is located a relatively short distance away from the (upper) end of the upper plate 43a, which is located facing the circular plate 63, which shortens the lifting arm for actuating the movable element 40 by the attraction force exerted by the ferromagnetic core 62. This short lifting arm allows the size of the electromagnet 7 to be reduced. Preferably, the rotational shaft 41 is laterally located above the coil 61, inside the extension of the cylinder formed thereby.

A return spring 45 is positioned on this rotational shaft 41, which spring bears against the fixed structure 30 and tends to bring the upper plate 43a of the movable element 40 away from the circular plate 63 of the ferromagnetic core 62 when no current circulates inside the coil.

Furthermore, an arm 42 extends radially from this rotational shaft 41 on the side of the movable plate 43, which arm forms a lever for setting the movable assembly 8, i.e. the cut-off bar 5 and the movable element 40, into rotation. To this end, in the embodiment shown in FIGS. 4 and 5, the cut-off bar 5 comprises a first cylindrical hole 51, into which the first pin 31 is accommodated, which acts as a pivot for the cut-off bar 5, and a second cylindrical hole 54, into which a second pin 44 is accommodated, which extends to the end of this arm 42, parallel to the rotational shaft 41, in order to act as a means for actuating said cut-off bar 5.

Figure 6:
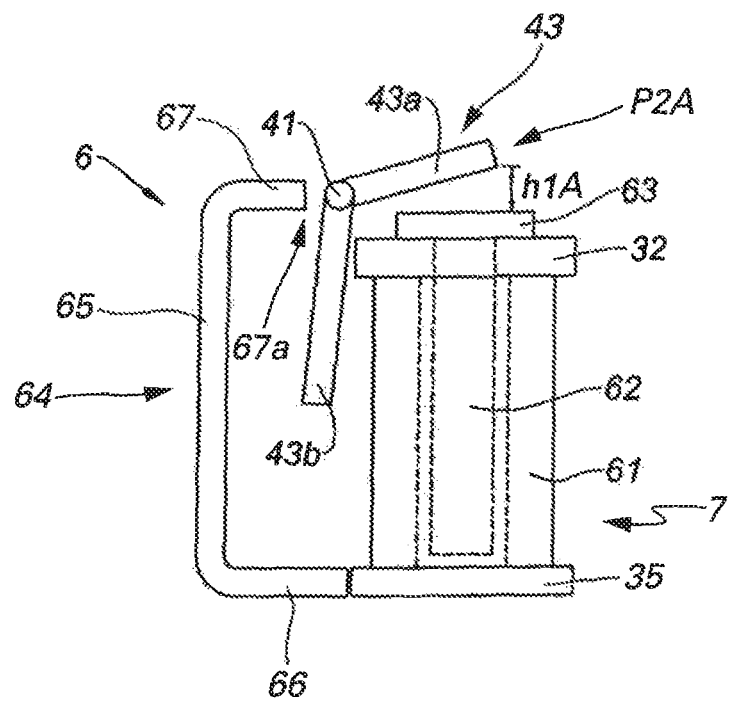
FIGS. 6 and 7 show schematic views of a motor for actuating the cut-off mechanism, respectively in a rest position and in an activation position, according to a first embodiment.
Figure 7:
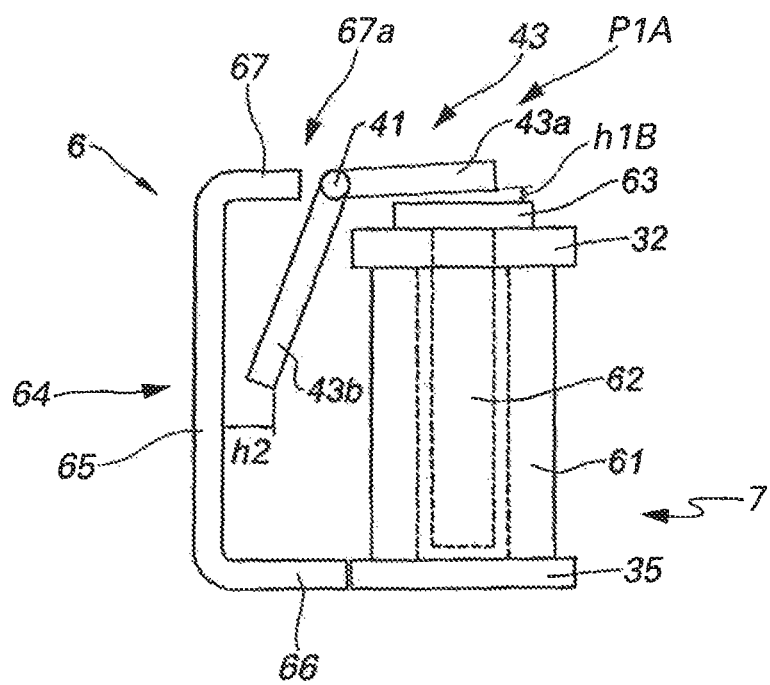

FIGS. 6 and 7 show the relative arrangement of the movable plate 43 and the metallic casing 64, respectively, in the two positions P1A and P2A that can be assumed by the movable element 40, i.e., on the one hand, in a position P2A, called rest position (FIG. 6), and, on the other hand, in a position P1A, called activation position (FIG. 7), under the action of the passage of a current in the coil 61.

In the rest position P2A (FIG. 6) no current passes into the coil 61 and the ferromagnetic core 62 does not exert any attraction on the movable plate 43. The upper plate 43a thereof is then spaced apart from the circular plate 63 of the ferromagnetic core 62 under the action of the return spring 45. No contact occurs between these two parts, which are separated from each other by a first gap h1A. The lines of force of the magnetic circuit, starting from the ferromagnetic core 62, thus pass via the metallic casing 64, then via the upper plate 43a and close on the core 62 through the first gap h1A.

In the activation position P1A (FIG. 7), where a current circulates in the coil 61, the ferromagnetic core 62 attracts the upper plate 43a of the movable plate 43, which approaches said ferromagnetic core 62 against the return spring 45. The first gap is then reduced (h1B) but is non-zero. Furthermore, the lower plate 43b approaches the central branch 65 of the metallic casing 64 so as to create a second contactless gap h2 therewith. In this configuration, the lines of force, starting from the ferromagnetic core 62, pass via the lower branch 66, then via the lower part of the central branch 65 of the metallic casing 64; they then pass through the gap h2 in order to then follow the lower plate 43b, then the upper plate 43a and close the circuit via the reduced gap h1B between this upper plate 43a and the circular plate 63.

In both cases, the magnetic circuit comprises at least one gap (h1A; h1B, h2), which opens the magnetic circuit and prevents its components from magnetising when the coil is powered, which eliminates the risk of adhesion of the upper plate 43a against the circular plate 63.

The movable element 40 is thus movable under the action of the electromagnet 7, against the return spring 45, between a first, near (activation) position and a second, remote rest position relative to said ferromagnetic core 62 via the first gap h1A.

According to the invention, the movable element 40 is configured to create an interruption in the continuity of the magnetic circuit formed by the ferromagnetic core 62, the metallic casing 64 and the movable element 40, when the movable element 40 comes near to said ferromagnetic core 62 in said activation position P1A.

The activation position, called near position (i.e., contactless), corresponds to a position in which there is a short gap h1B between the upper plate 43a and the circular plate 63, as is particularly shown in FIG. 7.

Furthermore, in one particular embodiment, the metallic casing 64 comprises, as shown in FIGS. 8 and 9, at least one attraction element 68. This attraction element 68 corresponds to a projecting element that is configured to facilitate the attraction of the movable element 40 when said element is brought from the rest position P2B (FIG. 8) to the activation position P1B (FIG. 9). FIGS. 8 and 9 are similar to FIGS. 6 and 7, particularly with positions denoted P1B and P2B instead of P1A and P2A.

The attraction element 68 is arranged on a side 64A of the central branch 65 (FIG. 5) of the metallic casing 64 at the lower end 46 of the lower plate 43b of the ferromagnetic plate 43 (FIG. 8). The attraction element 68 is a projecting element that is curved towards said lower plate 43b of the ferromagnetic plate 43 and is arranged laterally so as not to come into contact with the lower plate 43b during the rotation of the movable element 40. Thus formed and positioned, the attraction element 68 is firstly used, from the position P2B of FIG. 8, when a current powers the electromagnet, to assist in the attraction of the lower plate 43b, then to maintain a constant gap.

In the embodiment shown, the projecting attraction element 68 has a segment 69 that is partially cut out of the central branch 65 of the metallic casing 64 and is curved towards said lower plate 43b in the position P2B of the movable element 40.

In one variant of an embodiment (not shown), the metallic casing 64 can comprise such an attraction element on each of the sides 64A and 64B of the central branch 65.

Furthermore, in one particular embodiment, said movable assembly 8 is configured to have a load distribution that allows a balanced position to be obtained relative to the rotational shaft 41 of the movable element 40.

By thus balancing the masses of the movable element 40 and of the cut-off bar 7 about this rotational shaft 41, the attraction force needed to rotate the rotation assembly 8 can be relatively low. A small induction coil 61 thus can be used, which provides advantages in terms of cost and spatial requirement in particular.

In one preferred embodiment, this load distribution is generated by adding and/or removing material to/from at least one of said upper 43a and lower 43b plates of the ferromagnetic plate 43 and/or the cut-off bar 5. The load distribution can be obtained by adapting the thickness of one of the aforementioned parts or by any other conventional means.

Furthermore, in one particular embodiment, particularly shown in FIGS. 4, 5 and 10, the cut-off bar 5 is provided with a flexible stop 55 at one longitudinal end 53, opposite the longitudinal end 52 at which the cut-off bar 5 is connected to the movable element.

As shown in FIG. 10, the stop 55 comprises a segment 56, which is formed by a longitudinal cut-out 58 (along the longitudinal extension of the cut-off bar 5) made in the body 57 of the cut-off bar 5 near to its upper edge.

This segment 56 that is thus formed is flexible in the direction shown by an arrow E in FIG. 10. The segment 56 is provided with a projecting protuberance 59 intended to come into contact with a stop 60 (FIG. 4), which is in the form of a caliper and is rigidly connected to the armature 2, when the movable element returns to the rest position.

The flexible segment 56 allows the vibrations to be reduced that are generated in the cut-off bar 5 when it contacts the stop 60. The stop 55 thus allows noise to be reduced when the movable element returns to the rest position.

The operation of the cut-off mechanism 3 as described above will now be described.

The movable element 40, in its rest position, is spaced apart from the ferromagnetic core 62 under the action of the return spring 45 and leaves a gap h1A (FIGS. 6 and 8) between its upper plate 43a and the circular plate 63 of this core. This gap is selected so as to be relatively small so that the upper plate 43a can be attracted by the ferromagnetic core 62 by virtue of a low intensity current in the coil 61. The coil 61 of the electromagnet 7 thus can be small. At the same time, the lower plate 43b is relatively spaced apart from the metallic casing 64.

When a current is sent into the coil 61 in order to trigger the passage to the road position for the headlight, the upper plate 43a is attracted towards the circular plate 63. The two parts approach each other and the movable element 40 is designed so that the lower plate 43b does not come into contact with the metallic casing 64, forming the second gap h2. Thus, the magnetic circuit generated by the electromagnet does not close. In this way, a magnetisation and a residual magnetisation of the movable plate 43 are avoided, which would produce an effect of adhesion of the movable plate 43 on the circular plate 63.

Furthermore, the gap that is left free between the lower plate 43b and the central branch of the metallic casing 64 is calibrated so as to form a relatively small gap h2 between these two parts. As the magnetic circuit, in the activation position of the cut-off mechanism, passes via this lower plate and this central branch, an attraction is created between these two parts. This force is added to the attraction force of the upper plate 43a towards the circular plate 63 and continuously guarantees the position between the movable plate and the ferromagnetic core. This additional force allows, for example, any juddering from bumps in the road to be considered, which could detach these two parts. This additional attraction force is enhanced by the position and the action of the attraction element 68. Therefore, there is no need to oversize the main attraction force associated with the first gap h1A in order to take into account these unknowns.

The twin attraction created by the two gaps allows a reduction in the size of the coil 61 and, generally, of the entire electromagnet 7, and thus of the actuator motor 6 of the cut-off bar 5.

Finally, it is noteworthy that, whether the movable element 40 is in the rest position or in the activation position, the magnetic circuit passes via the rotational shaft 41. In one case, this runs along the upper branch of the casing in order to join the upper plate 43a at this rotational shaft. In the other case, it circulates on the lower part of the central branch of the metallic casing 64, then on the movable plate 43 and thus passes via the rotational shaft 41. This situation provides complete freedom for laterally positioning the rotational shaft 41, as long as it remains in this magnetic circuit. Thus, it can be placed as near as possible to the circular plate 63 and therefore significantly reduce the lever arm that activates the rotation of the movable element 40. In one preferred embodiment (not shown), the rotational shaft 41 is positioned laterally above the coil 61, in an intersecting manner with the cylinder extending said coil upwardly or downwardly.

What is claimed is:

1. A cut-off mechanism for a motor vehicle headlight, said mechanism:
   comprising a movable assembly that comprises a cut-off bar and a movable element supporting the cut-off bar;
   the cut-off bar being configured to enable a light beam to be obstructed in order to change an optical operating mode of a headlight;
   an actuator motor for actuating said movable element;
   the actuator motor comprising an electromagnet that comprises an induction coil associated with a fixed ferromagnetic core positioned at its center and a metallic casing surrounding said induction coil; and
   said movable element being movable under the action of said electromagnet against at least one return spring between a first near position and a second remote position relative to said ferromagnetic core via a first gap; and
   wherein said movable element is configured to create an interruption in a continuity of a magnetic circuit formed by said ferromagnetic core, said metallic casing and said movable element, when it comes near to said ferromagnetic core in said first position.

2. The Mechanism according to claim 1, wherein said interruption in continuity forms a second gap in said magnetic circuit.

3. The Mechanism according to claim 2, wherein said magnetic circuit generates, in said second gap, an attraction force on the movable element that tends to maintain it in said first position relative to the ferromagnetic core.

4. The Mechanism according to claim 2, said movable element further comprising:
   a ferromagnetic plate formed by an upper plate and a lower plate extending on both sides of a rotational shaft;
   said lower plate approaching a branch of the metallic casing until said second gap is created, during a rotation that brings the upper plate near to the ferromagnetic core in the first position of the movable element.

5. The Mechanism according to claim 4, wherein said load distribution is generated by one of adding material to or removing material from at least one of said upper and lower plates of the ferromagnetic plate.

6. The Mechanism according to claim 1, wherein said metallic casing comprises at least one attraction element configured to facilitate the attraction of the movable element, so as to attract it and maintain it in said first position.

7. The Mechanism according to claim 6, wherein said at least one attraction element is arranged on one side of a central branch of the metallic casing at a lower end of a lower plate of a ferromagnetic plate, by being curved towards said lower plate and by being arranged laterally so as not to come into contact with the lower plate during the rotation of the movable element.

8. The Mechanism according to claim 7, wherein said attraction element embodies a segment that is partially cut out of the central branch of the metallic casing and is curved towards said lower plate in the second position of the movable element.

9. The Mechanism according to claim 7, wherein said metallic casing comprises at least one attraction element on each of the sides of the central branch.

10. The Mechanism according to claim 1, wherein said movable assembly is configured to have a load distribution that allows a balanced position to be obtained relative to a rotational shaft of said movable element that is rotationally movable.

11. The Mechanism according to claim 1, wherein said cut-off bar is connected by a first longitudinal end to the movable element and it is provided, towards a second longitudinal end opposite the first longitudinal end with a flexible stop.

12. The Mechanism according to claim 11, wherein said stop comprises a segment formed longitudinally in a body of the cut-off bar.

13. The Mechanism according to claim 1, further comprising:
   a motor vehicle headlight comprising the at least one cut-off mechanism.

\* \* \* \* \*